United States Patent
Horspool et al.

(10) Patent No.: US 12,536,098 B1
(45) Date of Patent: Jan. 27, 2026

(54) SYSTEMS AND METHODS FOR MANAGING MEMORY BUFFERS FOR GARBAGE COLLECTION IN NON-VOLATILE STORAGE DEVICES

(71) Applicant: Kioxia Corporation, Tokyo (JP)

(72) Inventors: Nigel David Horspool, Great Missenden (GB); Brian Hatfield Clarke, Berks (GB)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/817,357

(22) Filed: Aug. 28, 2024

(51) Int. Cl.
*G06F 12/02* (2006.01)

(52) U.S. Cl.
CPC ............ *G06F 12/0246* (2013.01); *G06F 2212/7205* (2013.01)

(58) Field of Classification Search
CPC ......... G06F 12/0246; G06F 2212/7205; G06F 3/0679; G06F 2212/7201; G06F 2212/1016
See application file for complete search history.

(56) References Cited

U.S. PATENT DOCUMENTS

| | | | |
|---|---|---|---|
| 10,956,074 B2 * | 3/2021 | Liu | G06F 3/0659 |
| 11,733,888 B2 * | 8/2023 | Igahara | G06F 3/061 |
| | | | 711/103 |
| 2016/0283498 A1 * | 9/2016 | Beaverson | G06F 16/9017 |
| 2017/0177235 A1 * | 6/2017 | Nishikubo | G11C 11/5628 |
| 2018/0276118 A1 * | 9/2018 | Yanagida | G06F 12/0246 |
| 2019/0146704 A1 * | 5/2019 | Lin | G06F 3/0659 |
| | | | 711/103 |
| 2020/0174704 A1 * | 6/2020 | Lee | G06F 3/0679 |
| 2021/0034285 A1 * | 2/2021 | Kim | G06F 3/0652 |
| 2021/0223994 A1 * | 7/2021 | Kanno | G06F 3/0679 |
| 2022/0374163 A1 * | 11/2022 | Colella | G06F 3/0608 |
| 2024/0176736 A1 * | 5/2024 | Huang | G06F 12/1063 |
| 2025/0209173 A1 * | 6/2025 | Lee | G06F 21/566 |

* cited by examiner

*Primary Examiner* — Tasnima Matin
(74) *Attorney, Agent, or Firm* — Foley & Lardner LLP

(57) ABSTRACT

A system may include a controller, a non-volatile memory (NVM) array including an NVM and a program buffer, and a buffer for garbage collection. The controller may read valid data from a superblock and store the valid data to the buffer; in response to storing the valid data to the buffer, determine that a size of data stored in the buffer is greater than or equal to a first threshold and less than an amount of data for being written in a program mode, and write the data stored in the buffer, to the program buffer; determine that the size of data is greater than or equal to the amount of data, and program the data stored in the program buffer to the NVM; and in response to completion of writing the data stored in the buffer to the first program buffer, empty the buffer.

20 Claims, 9 Drawing Sheets

US 12,536,098 B1

SYSTEMS AND METHODS FOR MANAGING MEMORY BUFFERS FOR GARBAGE COLLECTION IN NON-VOLATILE STORAGE DEVICES

TECHNICAL FIELD

The arrangements described herein relate generally to performing garbage collection in a non-volatile memory (NVM) using one or more memory buffers, and more particularly to transferring or writing data to the NVM in smaller chunks during garbage collection.

BACKGROUND

A non-volatile memory storage device such as Solid State Drive (SSD) may include superblock structures each created by arranging physical blocks from different dies (e.g., NAND flash dies or NAND dies) or different planes of the dies as a single structure to support redundancy and protection against one or more of the constituent blocks failing. Such a superblock is commonly referred to as a Redundant Arrays of Independent Disk (RAID) structure as the constituent blocks share similarities with redundancy techniques (e.g., RAID5 or RAID6). Superblocks may be commonly used for enterprise and datacenter implementations, as well as in multi-tenant environments.

Modern SSDs can perform garbage collection by moving valid user data (referred to as "reclaim data") from NAND superblocks to one or more memory buffers, and then transferring or writing the data stored in the memory buffers into different NAND blocks to generate superblocks that are empty (e.g., superblocks that are garbage collected). In one aspect, the SSDs may stop host write data from being transferred to a NAND chip by sending the reclaim data to the NAND. The SSDs can include one or more reclaim data buffers and one or more reclaim program buffers to send new commands to transfer or write data from the one or more reclaim data buffers (as the source of the data) to the one or more reclaim program buffers and program the NAND with data in the reclaim program buffers. In some implementations, SSDs can assemble valid user data to a full or large amount of data that can be programed or written and store the assembled valid user data in reclaim data buffers to improve garbage collection performance. However, this large amount of assembled valid user data stored in the reclaim data buffers can reduce garbage collection performance because the large amount of the assembled valid user data may be stored in low-cost, slower DRAM (rather than faster SRAM) which can reduce garbage collection performance.

SUMMARY

The present arrangements relate to systems and methods for transferring or writing data to a non-volatile memory in smaller chunks during garbage collection.

According some arrangements, a system includes a controller, a non-volatile memory (NVM) array, and a first data buffer. The device may include an NVM and a first program buffer. The first data buffer may store data for garbage collection. The controller may be configured to read valid data from a superblock and store the valid data to the first data buffer. In response to storing the valid data to the first data buffer, the controller may be configured to determine that a size of data that is stored in the first data buffer and includes the valid data is greater than or equal to a first threshold and less than a second threshold corresponding to an amount of data for being programmed or written in a first program mode. The controller may be configured to transfer or write the data stored in the first data buffer, to the first program buffer. The controller may be configured to determine that a size of data stored in the first program buffer is greater than or equal to the second threshold, and to program or write the data stored in the first program buffer to the NVM. In response to completion of transferring or writing the data stored in the first data buffer to the first program buffer, the controller may be configured to empty the first data buffer.

According to some arrangements, a method includes reading, by a controller configured to control a non-volatile memory (NVM) array including an NVM and a first program buffer, valid data from a superblock and store the valid data to a first data buffer for garbage collection. The method may include in response to storing the valid data to the first data buffer, determining, by the controller, that a size of data that is stored in the first data buffer and includes the valid data is greater than or equal to a first threshold and less than a second threshold corresponding to an amount of data for being programmed or written in a first program mode. The method may include transferring or writing, by the controller, the data stored in the first data buffer, to the first program buffer. The method may include determining, by the controller, that a size of data stored in the first program buffer is greater than or equal to the second threshold, and programming or writing, by the controller, the data stored in the first program buffer to the NVM. The method may include in response to completion of transferring or writing the data stored in the first data buffer to the first program buffer, emptying, by the controller, the first data buffer.

BRIEF DESCRIPTION OF THE DRAWINGS

These and other aspects and features of the present arrangements will become apparent to those ordinarily skilled in the art upon review of the following description of specific arrangements in conjunction with the accompanying figures, wherein.

DETAILED DESCRIPTION

Some arrangements in the present disclosure relate to techniques for transferring or writing data to the NVM in smaller chunks during garbage collection. In some arrangements, a system may include a controller (e.g., a control logic in an SSD, an SoC (system on chip) controller), a non-volatile memory (NVM) array (e.g., NAND memory cell array), and a first data buffer (e.g., one or more reclaim data buffers for garbage collection). The device may include an NVM and a first program buffer. The first data buffer may store data for garbage collection. The controller may be configured to read valid data from a superblock and store the valid data to the first data buffer (e.g., reclaim data buffers). In response to storing the valid data to the first data buffer, the controller may be configured to determine that a size of data that is stored in the first data buffer and includes the valid data is greater than or equal to a first threshold and less than a second threshold corresponding to an amount of data for being programmed or written in a first program mode (e.g., a full data amount of a full sequence program (FSP) unit). The controller may be configured to transfer or write the data stored in the first data buffer, to the first program buffer. The controller may be configured to determine that a size of data stored in the first program buffer is greater than or equal to the second threshold (e.g., the full data amount of the FSP unit), and to program or write the data stored in the first program buffer to the NVM. In response to completion of transferring or writing the data stored in the first data buffer to the first program buffer, the controller may be configured to empty the first data buffer (so that the first data buffer can be re-used to garbage collect a new superblock).

Figure 1:
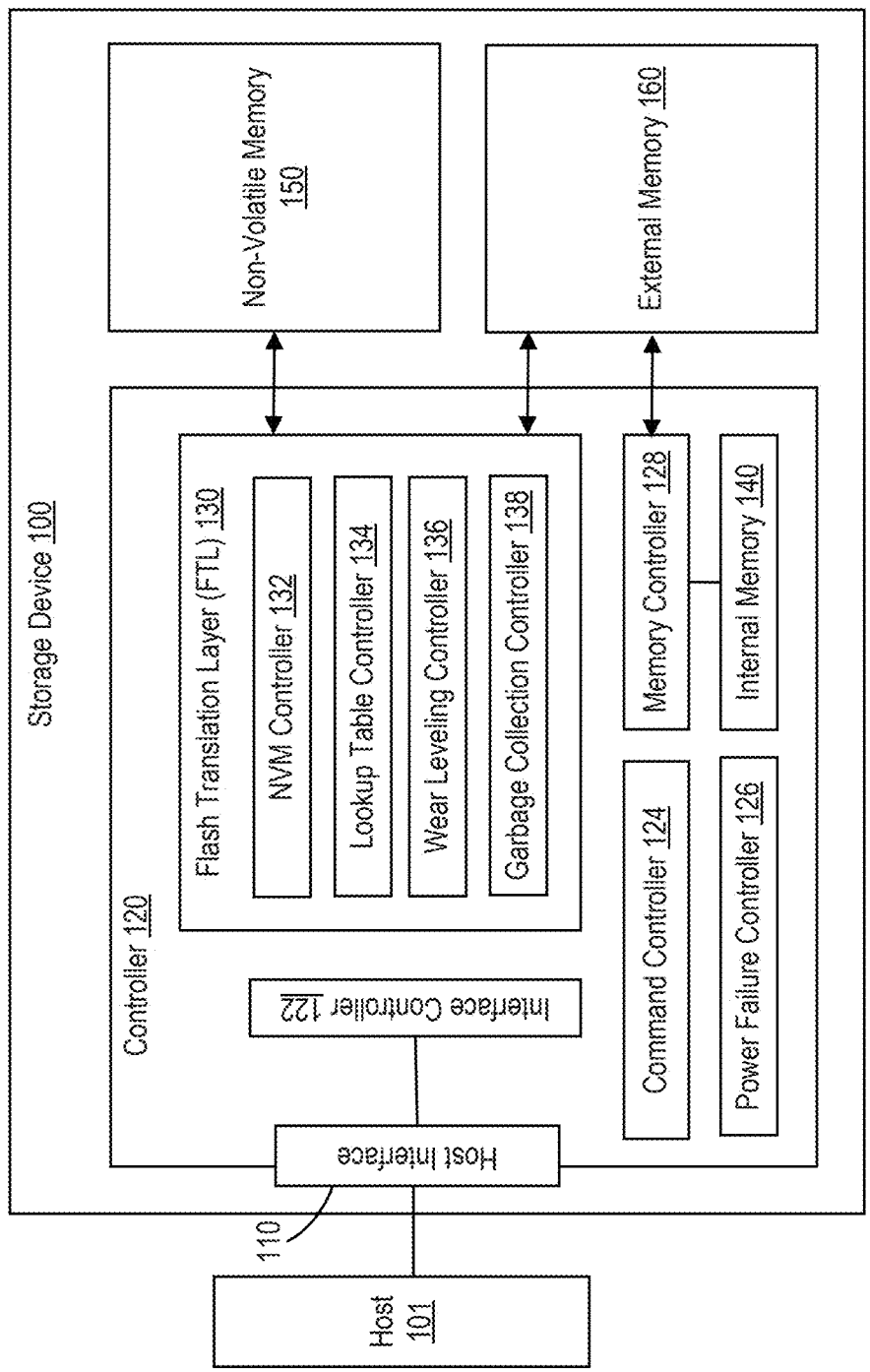
FIG. 1 shows a block diagram of an example system including a storage device coupled to a host according to some implementations.

FIG. 1 shows a block diagram of an example system including a storage device (e.g., SSD) coupled to a host according to some implementations. Referring to FIG. 1, a system (e.g., computer system) may include a host 101 and an SSD 100, which is a storage device and may be used as a main storage of an information processing apparatus (e.g., the host 101). The SSD 100 may be incorporated in the information processing apparatus or may be connected to the information processing apparatus via a cable or a network.

The host 101 may be an information processing apparatus (computing device) that accesses the SSD 100. The host 101 may be a server (storage server) that stores a large amount of various data in the SSD 100, or may be a personal computer. The host 101 includes a file system used for controlling file operation (e.g., creating, saving, updating, or deleting). For example, ZFS, Btrfs, XFS, ext 4, or NTFS may be used as the file system. Alternatively, a file object system (e.g., Ceph Object Storage Daemon) or a key value store system (e.g., RocksDB) may be used as the file system.

The SSD 100 may include a controller 120 (e.g., SoC controller), an internal memory 140 and/or an external memory 160. In some arrangements, the external memory 160 may include a random access memory which is a volatile memory, for example, DRAM (Dynamic Random Access Memory). In some arrangements, the controller 120 may include the internal memory 140 which includes a random access memory such as SRAM (Static Random Access Memory).

The SSD 100 includes, for example, the controller 120 and a non-volatile memory (e.g., flash memory) 150 as non-volatile memory (e.g., a NAND type flash memory).

The controller 120 may include processors, microcontrollers, central processing units (CPUs), caches, and/or buffers (e.g., buffers). The controller 120 includes, for example, a flash memory interface, and a DRAM interface, a host interface 110, all of which may be interconnected via a bus (not shown). The DRAM interface may function as a DRAM controller configured to control an access to the DRAM in the external memory. The flash memory interface may function as a flash memory control circuit (e.g., NAND control circuit) configured to control the flash memory 150 (e.g., NAND type flash memory). The controller 120 may be configured to perform various processes by executing a control program (e.g., firmware) stored in, for example, a ROM (not shown).

In some arrangements, the controller 120 may include a command controller 124 configured to perform a command control to execute command processing for processing various commands received from an information processing apparatus (e.g., a host computer). In some arrangements, the controller 120 may include a power failure controller 126 configured to perform a power failure control to detect a power failure.

In some arrangements, the controller 120 may include a flash translation layer (FTL) 130 configured to execute data management and block management of the flash memory 150. The FTL 130 may include a look-up table controller 134, a garbage collection controller 138, a wear leveling controller 136, and a flash memory controller 132. The data management may include management of mapping information indicating a correspondence relationship between a logical address (e.g., LBA (logical block address)) and a physical address of the flash memory 150. In some arrangements, the look-up table controller 134 may execute management of mapping between (1) each logical block address (LBA) or each logical page address and (2) each physical address using an address translation table (logical/physical address translation table). The garbage collection controller 138 may execute garbage collection (GC) which is a process executed to generate a free block as a data write destination block. The wear leveling controller 136 may execute wear leveling which is a process of leveling the number of times of block erasure so that by preventing an occurrence of blocks with a larger number of erasures, the failure probability of the SSD 100 can be reduced. The flash memory controller 132 may execute control of a flash memory interface to control the flash memory 150.

In some arrangements, the flash memory 150 may include a memory cell array which includes a plurality of flash memory blocks (e.g., NAND blocks). Each of the blocks may function as an erase unit. Each of the blocks includes a plurality of physical pages. In some arrangements, in the flash memory 150, data reading and data writing are executed on a page basis, and data erasing is executed on a block basis.

The controller 120 may include an interface controller 122 configured to control the host interface 190. The interface controller 122 may function as a circuit which receives various requests from the host 101 and transmits responses to the requests to the host 101. The requests may include various commands such as an I/O command and a control command. The I/O command may include, for example, a write command, a read command, a trim command (unmap command), a format command, and a flush command. The write command is also called a program command. The format command may be a command for unmapping the entire memory system (SSD 100).

Figure 2:
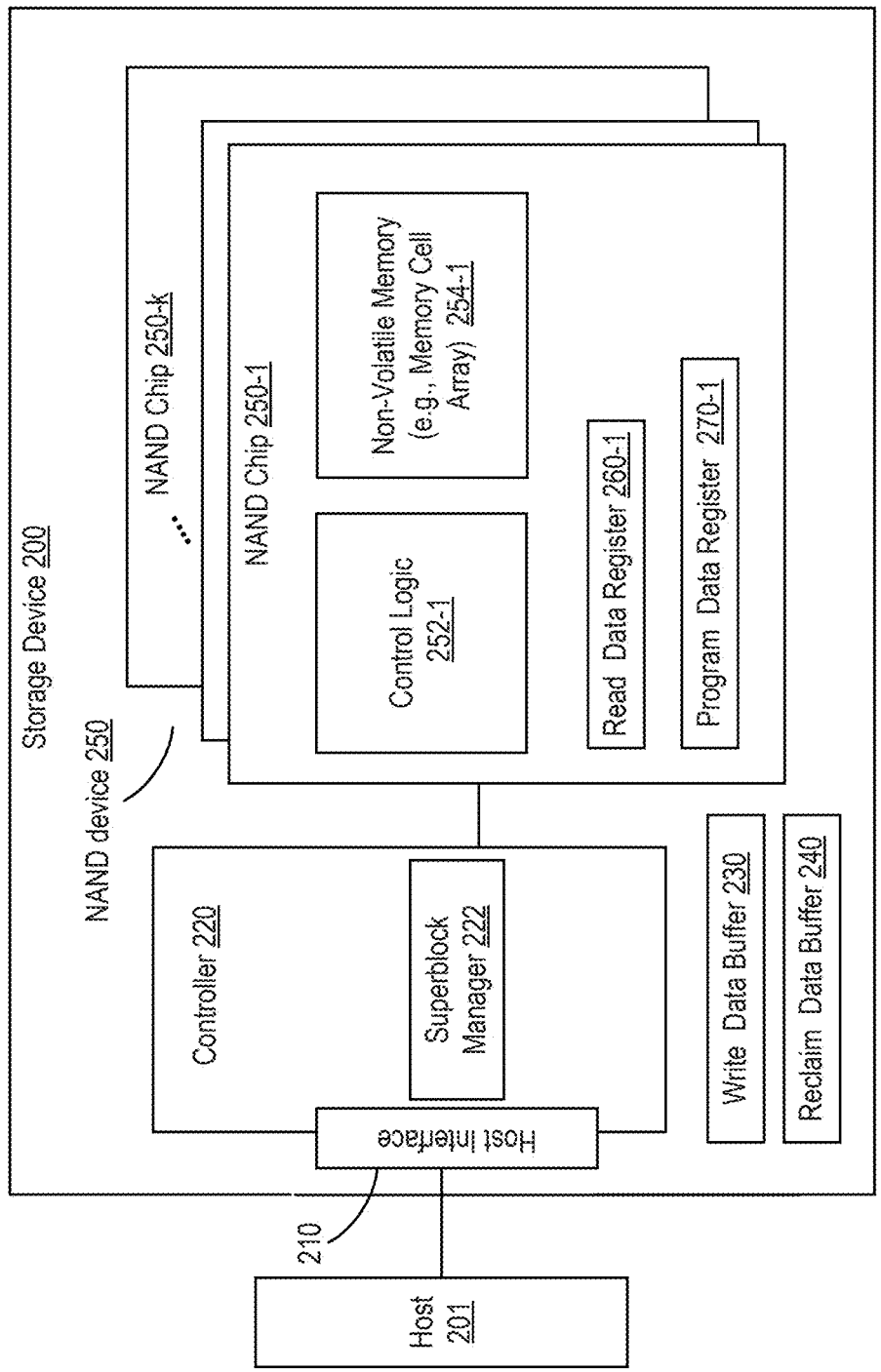
FIG. 2 shows a block diagram of another example system including a storage device coupled to a host according to some implementations.

FIG. 2 shows a block diagram of a system including a storage device 200 coupled to a host 201 according to some implementations. In some examples, the host 201 can be a user device operated by a user. The host 201 may include an Operating System (OS), which is configured to provide a file system and applications that use the file system. The file system communicates with the storage device 200 (e.g., a controller 220 of the storage device 200) over a suitable wired or wireless communication link or network to manage storage of data in the storage device 200.

In that regard, the file system of the host 201 sends data to and receives data from the storage device 200 using a suitable host interface 210 of the storage device 200. The host interface 210 allows the software (e.g., the file system) of the host 201 to communicate with the storage device 200 (e.g., the controller 220). While the host interface 210 is conceptually shown as a block between the host 201 and the storage device 200, the host interface 210 can include one or more controllers, one or more namespaces, ports, transport mechanisms, and connectivity thereof. To send and receive data, the software or file system of the host 201 communicates with the storage device 200 using a storage data transfer protocol running on the host interface 210. Examples of the protocol include but are not limited to, the Serial Attached Small Computer System Interface (SAS), Serial AT Attachment (SATA), and Non-Volatile Memory Express (NVMe) protocols. The host interface 210 includes hardware (e.g., controllers) implemented on the host 201, the storage device 200 (e.g., the controller 220), or another device operatively coupled to the host 201 and/or the storage device 200 via one or more suitable networks. The host interface 210 and the storage protocol running thereon also includes software and/or firmware executed on the hardware.

In some examples, the storage device 200 is located in a datacenter (not shown for brevity). The datacenter may include one or more platforms, each of which supports one or more storage devices (such as but not limited to, the storage device 200). In some arrangements, the storage devices within a platform are connected to a Top of Rack (TOR) switch and can communicate with each other via the TOR switch or another suitable intra-platform communication mechanism. In some arrangements, at least one router may facilitate communications among the storage devices in different platforms, racks, or cabinets via a suitable networking fabric. Examples of the storage device 200 include non-volatile devices such as but are not limited to, an SSD, a Non-Volatile Dual In-line Memory Module (NVDIMM), a Universal Flash Storage (UFS), a Secure Digital (SD) device, and so on.

The storage device 200 includes at least a controller 220 (e.g., SoC controller) and a flash memory device (e.g., NAND device) 250. The storage device 200 may include other components such as the components of the storage device 100 shown in FIG. 1. The controller 220 can include processors, microcontrollers, CPUs, caches, buffers (e.g., buffers), error correction systems, data encryption systems, Flash Translation Layers (FTLs), mapping tables, a flash interface, and so on. Such functions can be implemented in hardware, software, and firmware or any combination thereof. In some arrangements, the software/firmware of the controller 220 can be stored in the NAND device 250 or in any other suitable computer readable storage medium.

The storage device 200 may include an external memory (e.g., external memory 160) external to the controller 220. The external memory may include a random access memory which is a volatile memory, for example, DRAM. In some arrangements, the controller 220 may include an internal memory (e.g., internal memory 140) which includes a random access memory such as SRAM. The storage device 200 may include, for example, a write data buffer (also referred to as "write buffer") 230 used for temporarily storing data received from the host 201, and a reclaim data buffer (also referred to as "reclaim buffer", "reclaim register", "garbage collection buffer", or "garbage collection register") 240 used for a garbage collection. In some arrangements, each of the write data buffer 230 and the reclaim data buffer 240 may be included in one of an external memory or an internal memory.

The NAND device 250 includes one or more NAND devices (e.g., NAND chips) 250-1, . . . , 250-$k$ ($k$ is an integer greater than 0). Each of the one or more NAND chips (e.g., 250-1) may be an integrated circuit designed with one or more NAND gates built-in and attached to various pins. Each of the one or more NAND chips (e.g., 250-1) may include a control logic 252-1, an NVM (e.g., NAND memory cell array) 254-1, one or more read data registers (also referred to as "read registers" or "read buffers") 260-1, and one or more program data registers (also referred to as "program registers" or "program data buffers") 270-1. The one or more control logics 252-1, . . . , 252-$k$ are referred to as "control logic 252". The one or more NVMs 254-1, . . . , 254-$k$ are referred to as "NVM 254" or "memory cell array 254". The one or more read data registers 260-1, . . . , 260-$k$ are referred to as "read data registers 260". The one or more program data registers 270-1, . . . , 270-$k$ are referred to as "program data registers 270".

In some arrangements, the NAND memory cell array 254-1 may include one or more of the NAND flash dies, which are NVM capable of retaining data without power. Each of the dies in the NAND memory cell array may have one or more planes. Each plane has multiple blocks, and each block has multiple pages. The dies can be arranged in one or more memory communication channels connected to the control logic 252 and/or the controller 220.

Referring to FIG. 2, the memory cell array 254 can store multiple bits of data, for example, 3 bits (TLC) or 4 bits (QLC (quad-level cells)). The one or more read data registers 260 can temporarily store data read from the memory cell array. The one or more program data registers 270 can temporarily store data to be programmed or written to the memory cell array 254. In some arrangements, the read data registers 260 and the program data registers 270 can be separated from each other, thereby allowing read of the memory array while a program operation is stalled. In this manner, the storage device 200, the NAND device 250, or each NAND chip (e.g., 250-1) can allow reads of the memory cell array while a program is in operation (e.g., the program is stalled). The storage device 200, the NAND device 250, or each NAND chip (e.g., 250-1) can also allow reads of the memory cell array while transferring or writing program data to the program data register 270. In some arrangements, the size of a read data register is 64 KB, and the size of a program data register is 192 KB (i.e., 3×64 KB). In some arrangements, the actual size of the read data register (or the program data register) can be bigger than 64 KB (or 192 KB) to include error correction codes. The control logic 252-1 can manage input/output transfer of data and process commands sent over a data interface (e.g., an interface between a NAND chip and a controller of an SSD).

While the NVM or memory cell array 254 can be implemented as NAND dies, other examples of non-volatile memory technologies for implementing the NVM 254 include but are not limited to, Magnetic Random Access Memory (MRAM), Phase Change Memory (PCM), Ferro-Electric RAM (FeRAM), Resistive RAM (ReRAM), and so on that have locations for forming a superblock. The superblock management mechanisms described herein can be likewise implemented on memory systems using such memory technologies and other suitable memory technologies.

Examples of the controller 220 include but are not limited to, an SSD controller (e.g., a client SSD controller, a datacenter SSD controller, an enterprise SSD controller, and so on), a UFS controller, or an SD controller, and so on. The controller 220 can combine raw data storage in the dies of the NVM such that those dies function as a single storage. The controller 220 includes suitable processing and memory capabilities for executing functions described herein, among other functions. The controller 220 manages various features for the NVM or memory cell array, including but not limited to, I/O handling, reading, writing/programming, erasing, monitoring, logging, error handling, garbage collection, wear leveling, logical to physical address mapping, data protection (encryption/decryption), and the like. Thus, the controller 220 provides visibility to the dies of the NVM.

In some arrangements, the controller 220 includes a superblock manager 222 configured to manage forming and maintaining the superblocks in the manner described herein. For example, the superblock manager 222 can form superblocks from the dies of the NVM 254 by selecting or reselecting block locations (e.g., those dies of the NVM 254 or planes thereof) that form the superblocks. The superblock manager 222 can be implemented using the processing and memory capabilities of the controller 220. The superblock manager 222 can be firmware or software or hardware running on the controller 220 and stored as codes in one or more suitable non-transitory memory devices. In some examples, the superblock manager 222 stores a list of blocks (e.g., a list of physical addresses of the blocks) for each superblock in a local memory and/or in the non-volatile memory 254.

Figure 3:
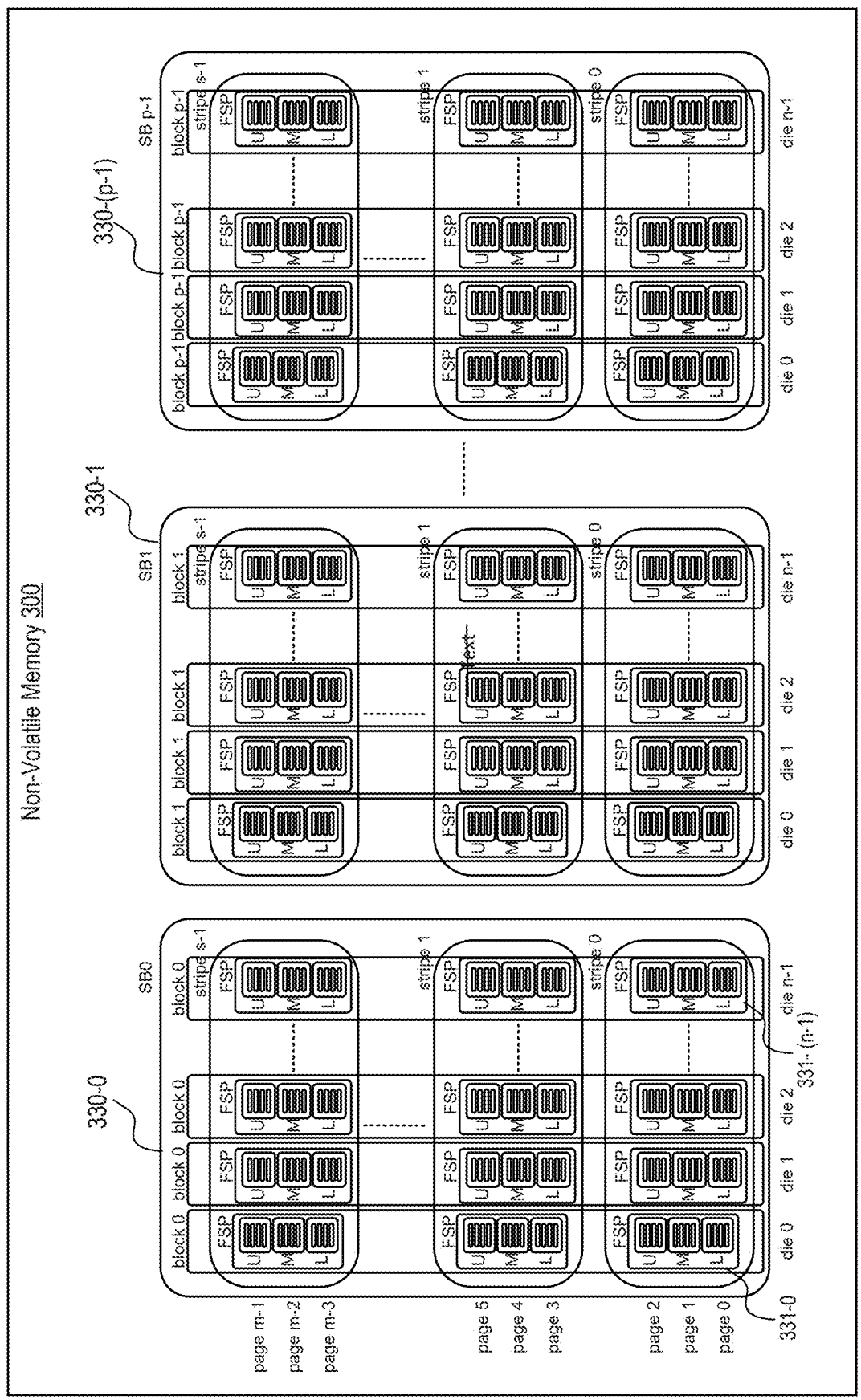
FIG. 3 is a schematic diagram illustrating an example of a plurality of superblocks in a storage device, according to some arrangements.

FIG. 3 is a schematic diagram illustrating an example of a plurality of superblocks 330-0, 330-1, ..., 330-($p$–1) in a storage device, according to some arrangements. Referring to FIG. 3, an NVM 300 may include a plurality of dies such as die 0, die 1, ..., die (n–1) where n is an integer greater than 0. For example, the NVM 150 and/or the NVM 254 can be implemented as the NVM 300. As shown in FIG. 3, the plurality of dies include p blocks such as block 0, block 1, ..., block (p–1) where p is an integer greater than 0. The p blocks are shown for illustrative purposes. It should be understood that a die may have any number of blocks. In some arrangements, a wordline String (WLSTR) represents a minimum number of pages for one full sequence program (FSP) unit in a NAND flash memory. In Triple-Level Cell (TLC) NAND, it includes lower, middle, and upper pages. These pages may be written simultaneously in TLC NAND. In some arrangements, a superblock WLSTR represents one wordline string (WLSTR) across all the dies in the superblock. For example, a plurality of FSP units 331-0, ..., 331-($n$–1) form a WLSTR for the superblock 330-0. It ensures that data is written consistently across all dies within the superblock. Similarly, a plurality of WLSTRs across the plurality of superblocks 330-0, 330-1, ..., 330-($p$–1) can form a stripe (e.g., strip 0 shown in FIG. 3).

Referring to FIG. 2 and FIG. 3, the superblock manager 222 may select a block from each of the planes to form a superblock. Thus, superblocks 330-0, 330-1, ..., and 330-($p$–1) (collectively 330) are formed. Each of the superblocks 330-0, 330-1, ..., and 330-($p$–1) is formed with a block from each plane of the dies 0 to (n–1). In some arrangements, the host 201 may send a stream of data to the storage device 200 via the host interface 210 to be written to the NVM 254. Data that belongs to the same stream are tagged with the same stream identifier (ID). A stream can be aligned to the size of one or more superblocks. For example, the storage device 200 can declare to the host 201 the size of one or more superblocks (e.g., superblocks 330) formed in the NVM 254. The controller 220 self-orchestrates GC, and the host 201 can provide hints to the storage device 200 to assist the controller 220 with coordinating the GC.

In some arrangements, a storage device (e.g., storage device 100, garbage collection controller 138, storage device 200, controller 220) can perform garbage collection by moving valid user data (also referred to as "valid data") from NAND superblocks (e.g., superblocks 330) that have some obsolete data, into different NAND blocks to generate superblocks that are empty (e.g., there are no valid data in the empty superblocks). Here, valid data refers to data that is currently in use and may not be removed from the flash device. Invalid data refers to data that is no longer of use and may be removed from the flash device. In some arrangements, the storage device can move valid data from a superblock to NAND blocks by temporarily storing the valid data (referred to as "reclaim data") in one or more reclaim data buffers (e.g., reclaim data buffers 240 in FIG. 2).

For example, assuming that the host is writing 4 KB random traffic, with datacenter storage devices (e.g., SSDs) the amount of reclaim data programmed or written to NAND blocks for garbage collection may be approximately 4 times the amount of host write data programmed or written to NAND blocks. To achieve high performance with 4 KB random write host traffic, the storage devices can perform garbage collection quickly by assembling reclaim data into a full data amount of FSP (full sequence programming) before sending the reclaim data to the NAND for programming. Assembling reclaim data can be performed for many NAND chips (e.g., NAND chips 250-1, ..., 250-$k$) in parallel. For example, the full data amount of each FSP unit is typically 192 KB, and thus with up to 128 NAND chips the total size of reclaim buffers can be approximately 24 MB (i.e., 192 KB×128). This size of reclaim buffers is typically too big for an internal memory (e.g., SRAM) because the size of an internal memory could be 4-8 MB, for instance, due to high cost of SRAM. Thus, the storage device may use DRAM buffers which consume more power and may limit the reclaim performance due to the DRAM data interface (e.g., DRAM is normally off-chip or external to a controller which requires data to be transferred or written through the DRAM data interface). Similarly, write data from the host can use buffers in either the internal memory or the external memory (for example, buffers in the external memory can be used when there is too much data in the internal memory). Thus, the storage device may use DRAM buffers which consume more power and may limit the host write performance due to the DRAM data interface.

Figure 4A:
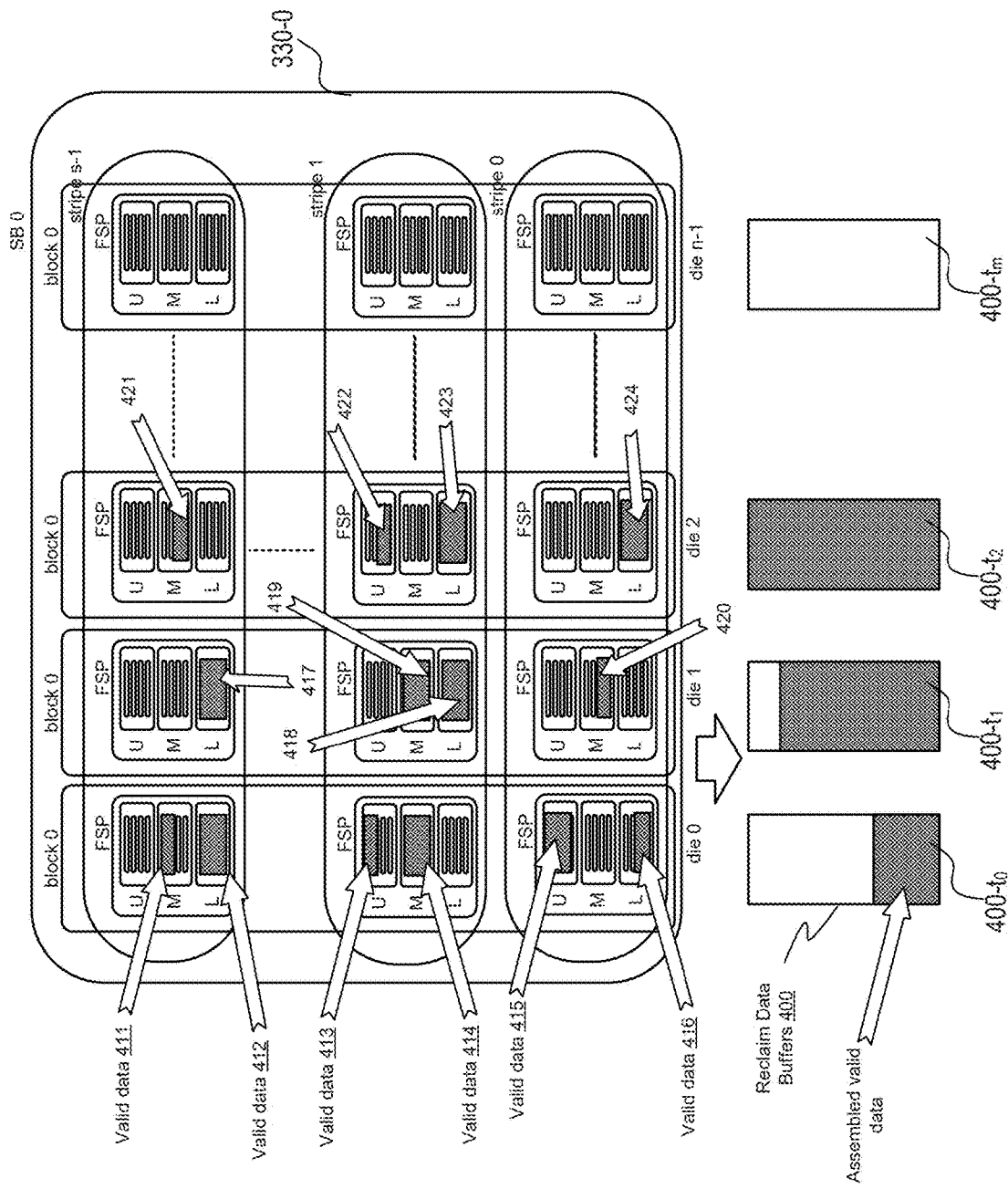
FIG. 4A is a schematic diagram illustrating an example superblock and example memory buffers for performing garbage collection in a storage device, according to some arrangements.

FIG. 4A is a schematic diagram illustrating an example superblock (e.g., superblock 330-0 shown in FIG. 3) and example memory buffers 400 for performing garbage collection in a storage device, according to some arrangements. A storage device (e.g., storage device 100, garbage collection controller 138, storage device 200, controller 220) can perform a reclaim process for garbage collection. Referring to FIG. 4A, the storage device can start the reclaim process by identifying a superblock candidate (e.g., superblock 303-0). Once the superblock candidate 303-0 has been identified, the storage device can read valid data (e.g., valid data 411, 412, 413, 414, 415, 416, 417, 418, 419, 420, 421, 422, 423, 424) from the superblock candidate 303-0 into the reclaim buffers 400. In some arrangements, the reclaim buffers 400 may be a single memory buffer. In some arrangements, the reclaim buffers 400 may include a plurality of memory buffers selected from a pool of memory buffers (e.g., a pool of memory buffers 450 in FIG. 4B). The reclaim buffers 400 can be included in at least one of an internal memory (e.g., internal memory 140) or an external memory (e.g., external memory 160). In some arrangements, the size of the reclaim buffers 400 may be the same as the full data amount of a FSP unit (e.g., 192 KB).

In some arrangements, the storage device may assemble valid data from the identified superblock candidate into the full data amount of a FSP unit (e.g., 192 KB). FIG. 4A shows assembled valid data (e.g., 400-$t_n$, 400-$t_1$, 400-$t_2$, . . . , 400-$t_m$) in the reclaim buffers 400 over time (e.g., to, $t_1$, $t_2$, . . . $t_m$) as a result of assembling valid data (e.g., valid data 411, 412, 413, 414, 415, 416, 417, 418, 419, 420, 421, 422, 423, 424) from the die 0 to die (n–1) of the identified superblock candidate 330-0. The storage device may determine that the size of the assembled valid data 400-$t_0$ is smaller than the full data amount of the FSP unit (e.g., 192 KB), and start assembling more valid data from the superblock candidate 330-0, which results in assembled valid data 400-$t_1$ in the reclaim buffers 400. The storage device may again determine that the size of the assembled valid data 400-$t_1$ is smaller than the full data amount of the FSP unit (e.g., 192 KB), and start assembling valid data from the superblock candidate 330-0, which results in assembled valid data 400-$t_2$ in the reclaim buffers 400. The storage device may determine that the size of the assembled valid data 400-$t_2$ is the same as the full data amount of the FSP unit.

In some arrangements, there is no direct relationship between the die from which valid data is read and a reclaim buffer into which that valid data is written. In some arrangements, a reclaim buffer is allocated of a size matching a size of program transfers to the NAND (e.g., the amount of a whole FSP). In some arrangements, valid data can be read from multiple die until the reclaim buffer is full, at which point the data within the buffer is queued for transfer to the reclaim buffer within the NAND. Once the transfer to NAND is completed, the reclaim buffer can be released/emptied. In some arrangements, once a whole FSP of data has been transferred to the NAND, the program operation may be queued, and a new reclaim buffer may be allocated and its filling may begin. In some arrangements, the order in which die pages are chosen to supply the valid data for reclaim may be an order in which data was originally written to the superblock. In some arrangements, the die read ordering may progress along a stripe of the superblock, matching the order in which data was originally written to the superblock.

In some arrangements, once the full data amount of the FSP unit (e.g., assembled valid data 400-$t_2$) has been assembled into the reclaim buffers 400, the storage device may transfer or write the FSP amount of reclaim data from the reclaim buffers 400 to the flash memory (e.g., NAND chip) and then free up or empty the reclaim buffers 400 (e.g., emptied reclaim buffer 400-$t_m$). In some arrangements, in response to completion of transferring or writing the data to the flash memory, the reclaim buffers occupied by the transferred data may be released or emptied. This can make more reclaim data buffer space available and make it more likely that reclaim data will reside in memory internal to the controller (e.g., SoC) and thus can improve performance.

The storage device may reuse the freed-up or emptied reclaim buffers for the reclaim process for another superblock. In response to transferring or writing the FSP amount of reclaim data from the reclaim buffers 400 to the flash memory, the storage device can program or write the reclaim data into a new NAND block. In some arrangements, the new NAND block may belong to a different superblock from the superblock that the reclaim data is read from.

Figure 4B:
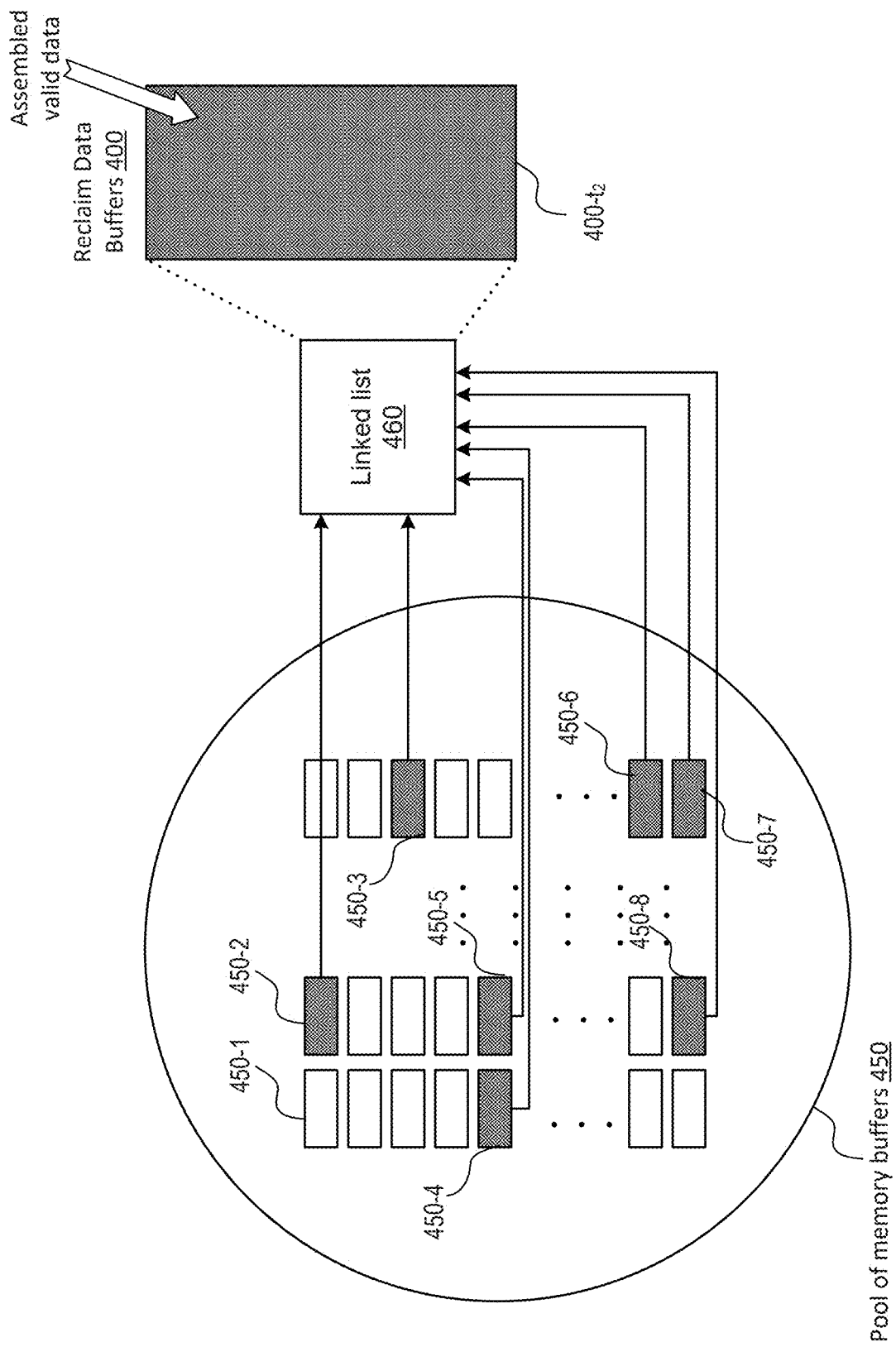
FIG. 4B is a schematic diagram illustrating an example pool of memory buffers for performing garbage collection in a storage device, according to some arrangements.

In some arrangements, the reclaim buffers 400 may be a single memory buffer that includes, for example, a number of contiguous 192 KB memory buffers. In some arrangements, the reclaim buffers 400 may include a plurality of memory buffers selected from a pool of memory buffers. FIG. 4B shows an example pool of memory buffers 450 for performing garbage collection (e.g., reclaim process), according to some arrangements. For example, the pool of memory buffers 450 may be a pool of many 4 KB chunks (or contiguous 4 KB memory buffer). In some arrangements, when each 4 KB buffer is filled, the storage device may create or generate, in a memory (e.g., internal memory, external memory, or cache memory), a linked list 460 of pointers to these 4 KB buffers to form a reclaim buffer 400. In response to determining that the total size of the 4 KB buffers in the linked list amounts to the full data amount of a FSP unit (e.g., 192 KB), the storage device may transfer or write the full 192 KB reclaim buffer to the flash memory (e.g., NVM or NAND chip 150, 250). Referring to FIG. 4B, the pool of memory buffers 450 may include one or more memory buffers that are not filled (e.g., memory buffer 450-1) and one or more memory buffers that have been filled (e.g., memory buffer 450-2). FIG. 4B shows that a plurality of memory buffers that have been filled (including memory buffers 450-2, 450-3, 450-4, 450-5, 450-6, 450-7, 450-8) can form a reclaim buffer filled with assembled valid data 400-$t_2$ having the full data amount of a FSP unit (e.g., 192 KB).

Figure 5:
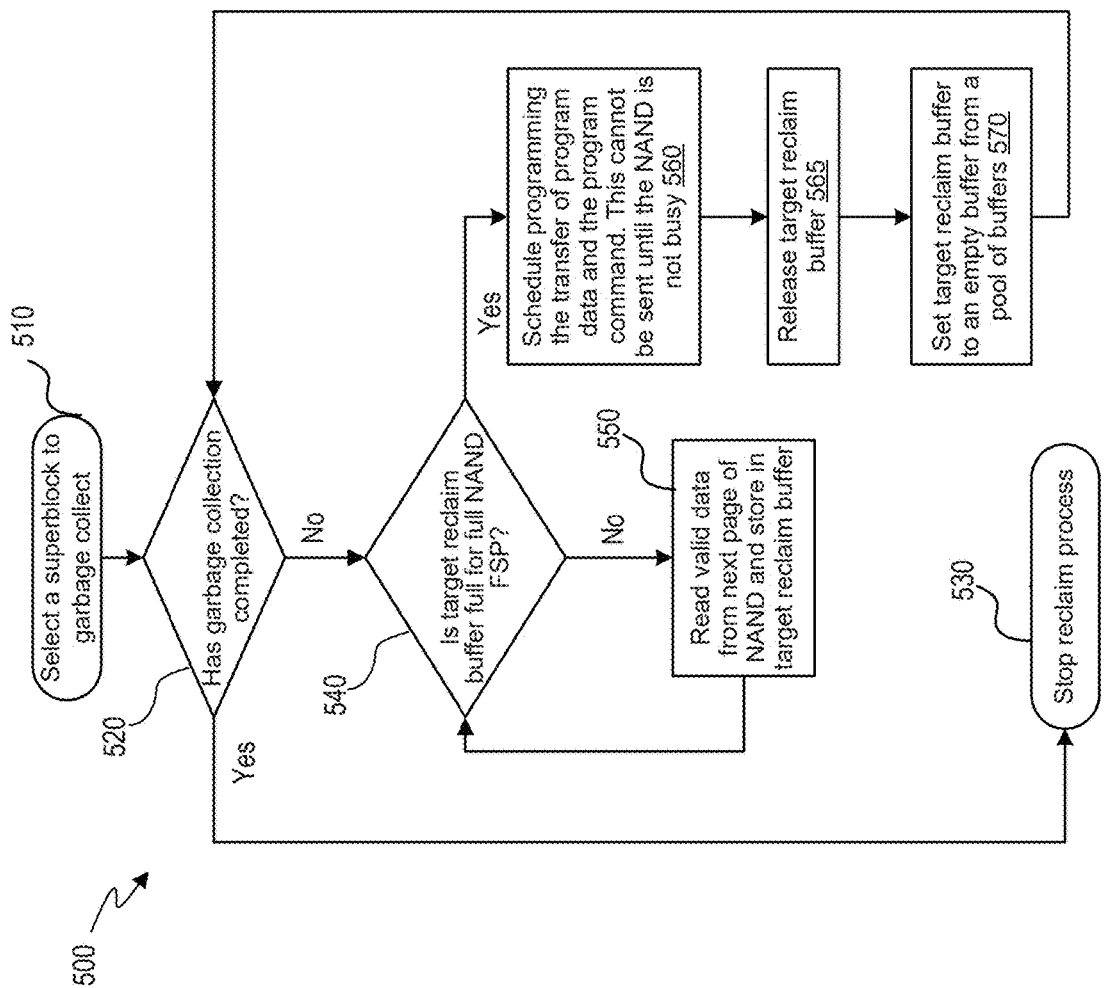
FIG. 5 is a flowchart diagram illustrating an example method for performing garbage collection in a storage device, according to some arrangements.

FIG. 5 is a flowchart diagram illustrating an example method for performing garbage collection (e.g., reclaim process) in a storage device, according to some arrangements. In this example, a reclaim process 500 begins in 510 by selecting or identifying a superblock (e.g., superblock candidate 330-0) to garbage collect. The process 500 can be performed by a storage device or a controller thereof (e.g., storage device 100, garbage collection controller 138, storage device 200, controller 220).

In 520, in some arrangements, the controller may determine whether garbage collection has completed. In 530, in some arrangements, in response to determining that garbage collection has completed, the controller may stop the reclaim process 500. In 540, in some arrangements, in response to determining that garbage collection has not completed, the controller may determine whether a target reclaim buffer (e.g., reclaim buffers 240, 400) is full for NAND FSP, e.g., filled with data having a size of full NAND FSP (e.g., 192 KB).

In 550, in some arrangements, in response to determining that the target reclaim buffer is not full for NAND FSP, the controller may read valid data from the superblock (e.g., superblock candidate 330-0). For example, the controller may read valid data from the next page of NAND (e.g., from the next page of die 1 of the superblock candidate 330-0) and temporarily store the valid data in the target reclaim buffer. In some arrangements, the size of the reclaim buffer may be defined by the NAND program size (e.g., 192 KB for TLC NAND or 256 KB for QLC, etc.).

In 560, in some arrangements, in response to determining that the target reclaim buffer is full for NAND FSP, the controller (e.g., FTL 130 or garbage collection controller 138) may schedule programming the transfer of program data (e.g., reclaim data stored in the target reclaim buffer having the size of 192 KB) and schedule a program command to program or write the transferred program data. In some arrangements, this programming cannot be sent until the NAND is not busy (for NAND reads, writes or erase).

In 565, in some arrangements, the controller may release, delete, or empty the reclaim data immediately after the program transfer has finished. In other words, the release does not need to wait until the following program operation (which may be much longer than the transfer operation) has finished.

In 570, in some arrangements, the controller may set the target reclaim buffer to an empty buffer. In some arrangements, the controller may set the size of valid data stored in the target reclaim buffer to zero. In some arrangements in which the target reclaim buffer is formed using a linked list (e.g., linked list 460) of pointers to buffers selected from a pool of buffers (e.g., pool of buffers 450), the controller may delete, from the linked list 460, the pointers to the buffers corresponding to the target reclaim buffer.

In one aspect, assuming there are a pool of reclaim buffers to allow higher garbage collection performance, a plurality of reclaim buffers in the pool (e.g., 16 192 KB reclaim buffers or 32 192 KB reclaim buffers) to allow garbage collection reads to continue even when the reclaim buffer is full. If 32 192 KB reclaim buffers are used, the storage device will require a minimum of 6 MB of memory (i.e., 192 KB×32). This 6 MB of memory could be either SoC internal SRAM memory, DRAM memory, or a combination of SRAM and DRAM. SRAM is generally faster than DRAM so that SRAM typically can give better garbage collection performance than DRAM, but can increase the cost of the storage device (e.g., SoC). On the other hand, DRAM generally has lower cost than SRAM, but can reduce garbage collection performance. As more reclaim data buffers are used, some data in the reclaim data buffers has to be stored in the DRAM which can impact the garbage collection performance.

To address this problem, according to certain aspects, arrangements in the present disclosure relate to techniques for transferring or writing reclaim data to a NAND memory (e.g., NVM, NAND flash memory, NAND memory cell array) in smaller chunks (e.g., smaller than a full data amount of an FSP unit) during garbage collection so that much less data or none has to be stored in an external memory (e.g., DRAM), thereby improving performance (e.g., performance of garbage collection) and reducing power consumption. In some arrangements, a storage device (e.g., SSD) can perform early filling of NAND chip buffers by filling memory buffers (e.g., reclaim data buffers) with valid data earlier than a time when the memory buffers are filled with the full data amount of the FSP unit.

In some arrangements, garbage collection operations or other operations according to the present disclosure can be implemented in firmware of a SoC controller. For example, the current firmware of a SoC controller can be modified to perform garbage collection operations or other operations (e.g., creating NAND program data commands and queues, etc.) according to the present disclosure.

In some arrangements, the storage device may include a NAND device (e.g., one or more NAND chips). A NAND chip can include a NAND memory, one or more read data registers for temporarily storing data read from the NAND memory (e.g., the NAND memory cell array), and one or more program data registers for temporarily storing data to be programmed or written to the NAND memory. In some arrangements, the one or more program data registers may include one or more reclaim program data register.

In some arrangements, the storage device can reduce the granularity of transfers or writes between memory buffers and the NAND memory (e.g., to a size smaller than the full data amount of an FSP unit) which would reduce size requirements of write data buffers or reclaim data buffers.

In some arrangements, the storage device can start to send reclaim data for garbage collection to a NAND device (e.g., a NAND chip), before reclaim data with a whole or full amount of an FSP unit is available in one or more memory buffers (e.g., reclaim data buffers). For example, the storage device can send reclaim data to a reclaim program data register of a NAND chip, before reclaim data with a whole or full amount of an FSP unit is available in the reclaim data buffers. In this manner, the reclaim data (referred to as "part-filled reclaim data") can be transferred in multiple chunks before transferring or writing a program command (e.g., array program command), so that NAND read commands can be executed between the data transfers.

In some arrangements, the storage device can use one or more thresholds (e.g., a first threshold of 4 KB, a second threshold of 192 KB corresponding to the full data amount of an FSP unit) to define a transfer-chunk size. The one or more thresholds can define the amount of data (e.g., reclaim data or host write data) as a transfer-chunk size before a first chunk of the data is transferred. The transfer-chunk size also can define the amount of data of the subsequent transfers.

In some arrangements, in response to the reclaim data (e.g., part-filled reclaim data) being transferred to the NAND device, the storage device can free up or empty the reclaim data buffers for being re-used for other data (e.g., data in another superblock) even before the transferred reclaim data is programmed or written to the NAND memory. When a sudden power loss occurs, the controller (e.g., SoC controller) can trigger the NAND device to program or write the part-filled reclaim data to the NAND memory so that the reclaim data stored in the reclaim program data register can be deleted. In some arrangements, the reclaim data is not erased in the original superblock until the reclaim data has been fully programed into the new superblock. Therefore, on a sudden power-loss, the reclaim data in the new superblock can be ignored/deleted without any loss of data. In some arrangements, upon a power loss, the NAND device can delete or ignore part-filled reclaim data stored in the reclaim program data register because the reclaim data is stored in the original superblock.

In one aspect, a storage device can transfer and/or accept program data (e.g., reclaim data) in multiple "chunks" rather than data in a single transfer. However, as soon as some of the reclaim data has been transferred to a NAND device (e.g., NAND chip), the NAND device may be unable to accept any new host write data. In other words, host write data would stay in write buffers (e.g., write data buffers 230) until a full amount reclaim data for FSP (e.g., 192 KB) has be read from a NAND superblock and transferred or written to a NAND program data register (e.g., program data register 270) and the program command has completed (which typically would take multiple milliseconds). As a result, more host write data buffers may be required, which further requires more internal memory or external memory.

To address this problem, in some arrangements, the storage device can add to the NAND device, program data registers (referred to as "bost write program data register", "write program data register" or "write program register") dedicated to host write data to be programmed to the NAND memory. In this manner, the storage device can send reclaim data to the reclaim program data register of the NAND device (to temporarily store the reclaim data in the reclaim program data register), but if host write data becomes available for the same NAND device then the storage device can prioritize the programming of the host write data such that the host write data is transferred or written to the write program data register and a program command to program or write the host write data is executed. In some arrangements, while programming of the host write data is being executed, the reclaim data can continue to be transferred or written to the reclaim program data register and the program command to program or write the reclaim data can be executed when the in-progress command (e.g., program command to program or write the host write data) completes.

In some arrangements, the NAND device may include one or more look-up table (LUT) program data registers dedicated to LUT program data and/or one or more program data registers to split LUT update and reclaim programs (referred to as "LUT reclaim program data register"). In some arrangements, the NAND and the reclaim process can be used to create empty superblocks for storing host user data LUT updates or LUT update program data ("LUT superblocks") that are separate from host user data superblocks. When these LUT superblocks are full, the LUT superblocks can be reclaimed in a similar way as the host user data superblocks. In some arrangements, the NAND can contain two program registers including a LUT program register and a LUT reclaim program register. The LUT program register can be used for the LUT update program data and the LUT reclaim program register can be for the reclaim of the LUT update program data.

In some arrangements, the LUT may be a table that stores mapping of logical addresses to NAND physical addresses (referred to as "L2P Table"). While the majority of the data stored in the NAND chips may be host user data, a storage device (e.g., a SoC controller, firmware of the SoC controller) can store an L2P Table to NAND superblocks. The storage device can garbage collect (or reclaim) these superblocks that store the L2P table. For example, as soon as some of reclaim data of host user data has been transferred or written to the NAND device, the NAND device may be unable to accept any reclaim data of the L2P table.

To address this problem, in some arrangements, the storage device can add to the NAND device, program data register dedicated to L2P table reclaim program data (referred to as "L2P table reclaim program data register"). In this manner, the storage device can send reclaim data to the reclaim program data register of the NAND device (to temporarily store the reclaim data in the reclaim program data register), but if L2P table reclaim data becomes available for the same NAND device then the storage device can prioritize the programming of the L2P table reclaim data such that the L2P table reclaim data is transferred or written to the L2P table reclaim program data register and a program command to program the L2P table reclaim data is executed. In some arrangements, while programming of the L2P table reclaim data is being executed, other reclaim data (other than L2P table reclaim data) can continue to be transferred or written to the reclaim program data register and the program command to program or write the reclaim data can be executed when the in-progress command (e.g., program command to program or write the L2P table reclaim data) completes.

In one aspect, the storage device may not free up or empty a host write data buffer (e.g., write data buffer 230) until data stored in the host write data buffer with the whole (or full) data amount of an FSP unit is transferred and programming or writing the transferred data has started, in order to guarantee that the program array operation can be completed if a power failure occurs. The reason is because a look-up table (LUT) is only updated once all program data has been transferred or written.

To address this problem, in some arrangements, the storage device can start to send host write data (referred to as "part-filled host write data") to the NAND device before host write data with a whole or full amount of an FSP unit is available in write data buffers. In this manner, the host write data can be transferred in multiple chunks before transferring or writing a program command (e.g., array program command), so that NAND read commands can be executed between the data transfers.

In some arrangements, a host write data buffer can be freed up before data stored in the host write data buffer with the whole (or full) data amount of an FSP unit is transferred and programming the transferred data has started. When a sudden power loss occurs, the controller (e.g., SoC controller) can trigger the NAND device to program or write part-filled host write data to the NAND memory. In some arrangements, the LUT can be updated for only those clusters/data transferred to the NAND device. In some arrangements, upon a power loss, the NAND device can write part-filled host write data stored in the write program data register using a 3 pSLC mode rather than a single TLC page. The 3 pSLC mode can be performed quicker and can save more energy than a TLC mode. In some arrangements, periodically, when no write data has been sent to the NAND device for a significant period of time, the controller can send a command to program or write part-filled host write data to the NAND memory.

In some arrangements, a reclaim process of garbage collection can begin in a first step by selecting or identifying a superblock (e.g., superblock candidate 330-0) to garbage collect. The reclaim process can be performed by a storage device or a controller thereof.

In a second step, in some arrangements, the controller may determine whether garbage collection has completed. In a third step, in some arrangements, in response to determining that garbage collection has completed, the controller may stop the reclaim process. In a fourth step, in some arrangements, in response to determining that garbage collection has not completed, the controller may determine whether a target reclaim buffer (e.g., reclaim buffers 400) is full for an amount of a first threshold, e.g., filled with data having a size 64 KB which is less than a full amount of NAND FSP (e.g., 192 KB).

In a fifth step, in some arrangements, in response to determining that the target reclaim buffer is not full for the amount of the first threshold, the controller may read valid data from the superblock (e.g., superblock candidate 330-0). For example, the controller may read valid data from the next page of a NAND memory (e.g., from the next page of die 1 of the superblock candidate 330-0) and temporarily store the valid data in the target reclaim buffer. In some arrangements, the size of the reclaim buffer may be greater than or equal to the amount of the first threshold.

In a sixth step, in some arrangements, in response to determining that the target reclaim buffer is full for the amount of the first threshold, the controller (e.g., FTL) may schedule the transfer of program data (e.g., reclaim data stored in the target reclaim buffer having the size of 64 KB) to a NAND device. In some arrangements, the controller may transfer or write the reclaim data to a reclaim program data register of the NAND device. In a seventh step, in some arrangements, the controller may set the target reclaim buffer to an empty buffer. In some arrangements, the controller may set the size of valid data stored in the target reclaim buffer to zero. In some arrangements in which the target reclaim buffer is formed using a linked list of pointers to buffers selected from a pool of buffers, the controller may delete, from the linked list, the pointer to the buffers corresponding to the target reclaim buffer.

In an eighth step, in some arrangements, the controller may determine whether a full amount of NAND FSP has been transferred or written to the NAND device. In some arrangements, the controller may determine whether a size of data stored in the reclaim program data register of the NAND device is greater than or equal to the full amount of NAND FSP. In response to determining that the full amount of NAND FSP has not been transferred or written to the NAND device, the controller may perform the second step to resume read of valid data from the superblock. In this manner, the read of valid data from the superblock can continue to be performed until the amount of reclaim data transferred or written to the NAND reaches the full amount of NAND FSP. In a ninth step, in some arrangements, in response to determining that the full amount of NAND FSP has been transferred or written to the NAND, the controller (e.g., FTL) may schedule a NAND program command to program or write the reclaim data with the full amount of NAND FSP to the NAND memory.

In one approach, a system may include a controller, a non-volatile memory (NVM) array, and a first data buffer. The NVM array may include a non-volatile memory (NVM) and a first program buffer. The first data buffer may store data for garbage collection. The controller may be configured to read valid data from a superblock and store the valid data to the first data buffer. In response to storing the valid data to the first data buffer, the controller may be configured to determine that a size of data that is stored in the first data buffer and includes the valid data is greater than or equal to a first threshold and less than a second threshold corresponding to an amount of data for being programmed or written in a first program mode. The controller may be configured to transfer or write the data stored in the first data buffer, to the first program buffer. The controller may be configured to determine that a size of data stored in the first program buffer is greater than or equal to the second threshold, and to program or write the data stored in the first program buffer to the NVM. In response to completion of transferring or writing the data stored in the first data buffer to the first program buffer, the controller may be configured to empty the first data buffer.

In some arrangements, the first program mode may be a full sequence program. The NVM array may be configured to program or write the data stored in the first program buffer to the NVM using the full sequence program.

In some arrangements, the NVM array may further include a second program buffer that is different from the first program buffer. The controller may be configured to transfer or write data received from a host, to the second program buffer. The controller may be configured to program or write data in the second program buffer to the NVM with a priority higher than a priority with which data stored in the first program buffer is programmed or written to the NVM. Upon a power failure, the controller may be configured to program or write the write data in the second program buffer to the NVM using a pseudo single-level cell (pSLC) mode.

In some arrangements, the NVM array may further include a third program buffer that is different from the first program buffer. The controller may be configured to read, from a further superblock, further data representing mapping of logical addresses to NVM physical addresses. The controller may be configured to transfer or write the further data to the third program buffer. The controller may be configured to program or write data in the third program buffer to the NVM with a priority higher than a priority with which data stored in the first program buffer is programmed or written to the NVM.

In some arrangements, a size of the first data buffer may be equal to the first threshold. A size of the first program buffer may be equal to the second threshold. In some arrangements, the controller may be configured to empty the first data buffer by setting a size of valid data stored in the first data buffer to zero.

Arrangements in the present disclosure have at least the following advantages and benefits. First, arrangements in the present disclosure can provide useful techniques for transferring or writing reclaim data (or host write data) to the flash memory (e.g., NAND memory cell array) in smaller chunks (e.g., smaller than a full data amount of an FSP unit) so that much less data or none has to be stored in an external memory (e.g., DRAM), thereby improving performance (e.g., performance of garbage collection) and reducing power consumption.

Second, arrangements in the present disclosure can provide useful techniques for providing separate program data registers (or separate data buffers) for the reclaim program data (or reclaim data) and the host write program data (or host write data). In this manner, the storage device can send reclaim data to the NAND, but if host write data becomes available for the same NAND then the storage device can prioritize the programming of the host write data such that the host write data is transferred or written to the host write program register and a program command to program or write the host write data is executed. Moreover, while programming of the host write data is being executed, the reclaim data can continue to be transferred to the reclaim program register and the program command to program or write the reclaim data can be executed when the in-progress command (e.g., program command to program or write the host write data) completes.

Third, arrangements in the present disclosure can provide useful techniques for providing a program data register dedicated to L2P table reclaim program data. In this manner, the storage device can send reclaim data to a reclaim program data register of the NAND device, but if L2P table reclaim data becomes available for the same NAND device then the storage device can prioritize the programming of the L2P table reclaim data such that the L2P table reclaim data is transferred to the L2P table reclaim program data register and a program command to program or write the L2P table reclaim data is executed. Moreover, while programming of the L2P table reclaim data is being executed, other reclaim data (other than L2P table reclaim data) can continue to be transferred to the reclaim program data register and the program command to program or write the reclaim data can be executed when the in-progress command (e.g., program command to program or write the L2P table reclaim data) completes.

Figure 6:
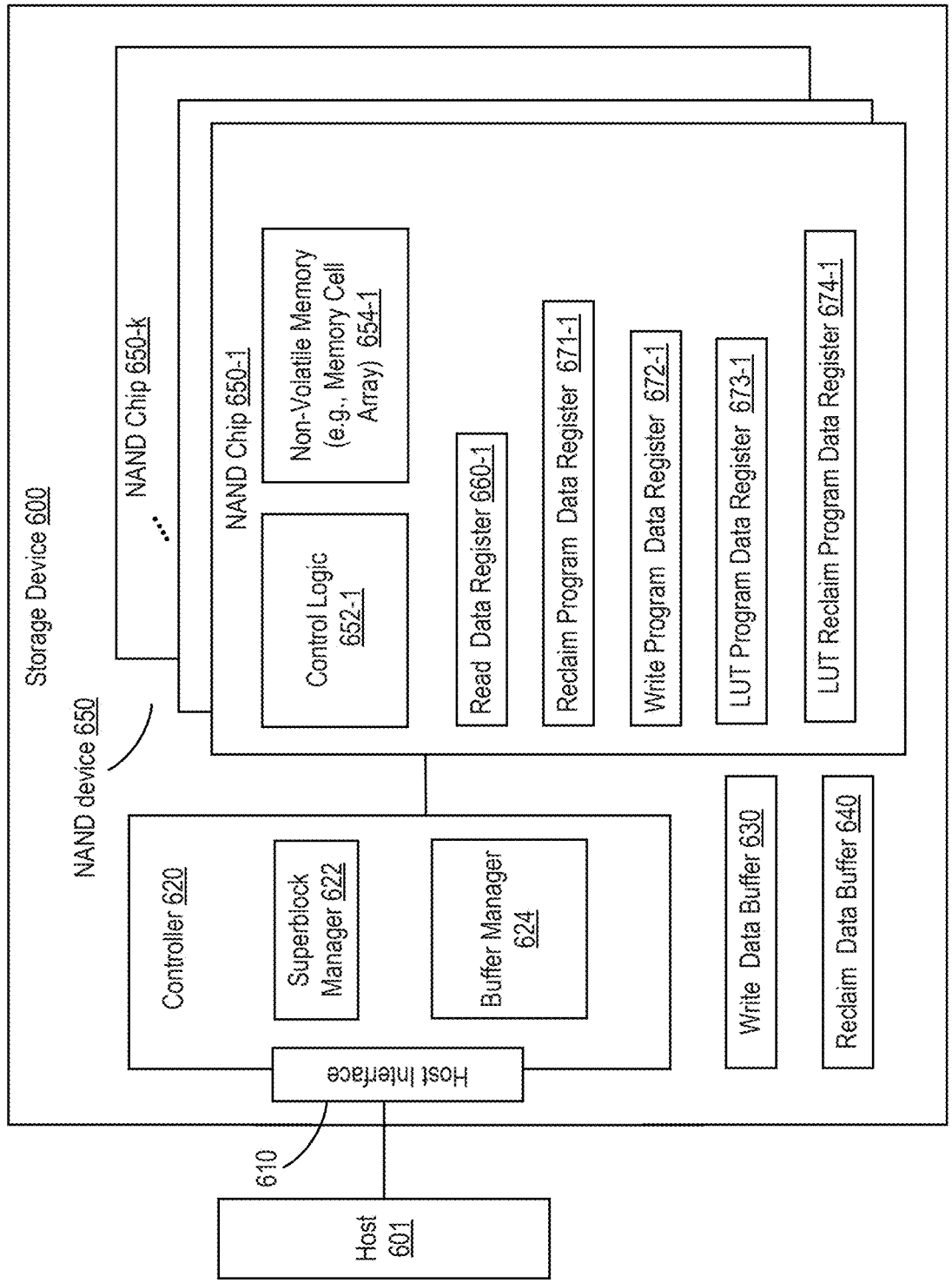
FIG. 6 shows a block diagram of yet another example system including a storage device coupled to a host according to some implementations.

FIG. 6 shows a block diagram of yet another example system including a storage device (e.g., SSD) coupled to a host according to some implementations. Referring to FIG. 6, a system (e.g., computer system) may include a host 601 and an SSD 600, which is a storage device and may be used as a main storage of an information processing apparatus (e.g., the host 601). The host 601 may have configuration similar to that of the host 101 or 201. The SSD 600 may be incorporated in the information processing apparatus or may be connected to the information processing apparatus via a cable or a network. The SSD 600 may include a host interface 610 to the host 601, a controller 620 including a superblock manager 622 and a buffer manager 624, a NAND device 650, a write data buffer 630, and/or a reclaim data buffer 640.

In some arrangements, the NAND device 650 includes one or more NAND devices (e.g., NAND chips) 650-1, ..., 650-$k$ ($k$ is an integer greater than 0). Each of the one or more NAND chips (e.g., 650-1) may be an integrated circuit designed with one or more NAND gates built-in and attached to various pins. The one or more NAND chips 650-1, ..., 650-$k$ (collectively 650) may respectively include one or more control logics 652-1, ..., 652-$k$ (collectively 652), one or more NVMs (e.g., NAND memory, NAND memory cell arrays) 654-1, ..., 654-$k$ (collectively 654), one or more read data registers 660-1, ..., 660-$k$ (collectively 660), one or more reclaim program data registers 671-1, ..., 671-$k$ (collectively 671), one or more (host) write program data registers 672-1, ..., 672-$k$ (collectively 672), one or more LUT program data registers 673-1, ..., 673-$k$ (collectively 673), and/or one or more LUT reclaim program data registers 674-1, ..., 674-$k$ (collectively 674), In some arrangements, the SSD 600 may have configuration similar to the SSD 100 or 200 except for (1) the SSD 600 includes the buffer manager 624 in the controller 620 and (2) the NAND device 650 includes the reclaim program data registers 671, the write program data registers 672, the LUT program data registers 673, and/or the LUT reclaim program data registers 674. In some arrangements, garbage collection operations or other operations according to the present disclosure can be implemented in firmware of a SoC controller (e.g., controller 620). For example, the current firmware of a SoC controller can be modified to perform garbage collection operations or other operations (e.g., creating NAND program data commands and queues, etc.) according to the present disclosure.

In some arrangements, the SSD 600 (or buffer manager 624) may transfer or write reclaim data to a NAND memory (e.g., NAND memory cell array 654) in smaller chunks (e.g., 4 KB chuck or 64 KB chunk that is smaller than a full data amount of an FSP unit, e.g., 192 KB) during garbage collection so that much less data or none has to be stored in an external memory (e.g., DRAM), thereby improving performance (e.g., performance of garbage collection) and reducing power consumption. The SSD 660 can perform early filling of NAND chip buffers by filling memory buffers (e.g., reclaim data buffers 640) with valid data earlier than a time when the memory buffers are filled with the full data amount of the FSP unit (e.g., 192 KB).

In some arrangements, the one or more read data registers 660 may be configured to temporarily store data read from the memory cell array 654, and the one or more program data registers 671, 672, 673, 674 are configured to temporarily store data to be programmed or written to the NAND memory. The SSD 600 can reduce the granularity of transfers between memory buffers (e.g., write data buffers 630, reclaim data buffers 640) and the NAND memory (e.g., NAND memory 654) to a size (e.g., 64 KB) smaller than the full data amount of an FSP unit (e.g., 192 KB) which would reduce size requirements of the write data buffers 630 or reclaim data buffers 640.

In some arrangements, the SSD 600 (or buffer manager 624) can start to send reclaim data for garbage collection to a NAND device 650 (e.g., a NAND chip 650-1), before reclaim data with a whole or full amount of an FSP unit (e.g. 192 KB) is available in one or more memory buffers (e.g., reclaim data buffers 640). For example, the SSD 600 can send reclaim data to a reclaim program data register 671-1 of a NAND chip 650-1, before reclaim data with a whole or full amount of an FSP unit is available in the reclaim data buffers 640. In this manner, the part-filled reclaim data can be transferred or written in multiple chunks before transferring or writing a program command (e.g., array program command), so that NAND read commands can be executed between the data transfers.

In some arrangements, the SSD 600 (or buffer manager 624) can use one or more thresholds (e.g., a first threshold of 4 KB, a second threshold of 192 KB corresponding to the full data amount of an FSP unit) to define a transfer-chunk size. The one or more thresholds (e.g., the first threshold of 4 KB) can define the amount of data (e.g., reclaim data or host write data) as a transfer-chunk size (e.g., transfer-chunk size of 4 KB) before a first chunk of the data is transferred. The transfer-chunk size also can define the amount of data of the subsequent transfers (e.g., transfer-chunk size of 4 KB).

In some arrangements, in response to the part-filled reclaim data being transferred or written to the NAND device (e.g., NAND chip 650-1), the SSD 600 (or buffer manager 624) can free up or empty the reclaim data buffers 640 for being re-used for other data (e.g., data in another superblock) even before the transferred reclaim data is programmed to the NAND memory (e.g., memory cell array 654-1).

In some arrangements, the SSD 600 can add to the NAND device 650, one or more write program data registers 672 dedicated to host write data to be programmed or written to the NAND memory 654. In this manner, the SSD 600 can send reclaim data to a reclaim program data registers 671-1 of a NAND chip 650-1 (to temporarily store the reclaim data in the reclaim program data register 671-1), but if host write data becomes available for the same NAND chip 650-1 then the SSD 600 can prioritize the programming of the host write data such that the host write data is transferred or written to the write program data register 672-1 and a program command to program or write the host write data is executed. While programming of the host write data is being executed, the reclaim data can continue to be transferred or written to the reclaim program data register 671-1 and the program command to program or write the reclaim data can be executed when the in-progress command (e.g., program command to program or write the host write data) completes.

In some arrangements, the NAND device 650 may include one or more look-up table (LUT) program data registers 673 dedicated to LUT program data and/or one or more LUT reclaim program data registers 674 to split LUT update and reclaim programs.

In some arrangements, the one or more LUT reclaim program data registers 674 may include one or more program data registers dedicated to L2P table reclaim program data (referred to as "L2P table reclaim program data register"). In this manner, the SSD 600 can send reclaim data to the reclaim program data register 671-1 of a NAND chip 650-1 (to temporarily store the reclaim data in the reclaim program data register 671-1), but if L2P table reclaim data becomes available for the same NAND chip 650-1 then the SSD 600 can prioritize the programming of the L2P table reclaim data such that the L2P table reclaim data is transferred or written to the L2P table reclaim program data register and a program command to program or write the L2P table reclaim data is executed. While programming of the L2P table reclaim data is being executed, other reclaim data (other than L2P table reclaim data) can continue to be transferred or written to the reclaim program data register 671-1 and the program command to program or write the reclaim data can be executed when the in-progress command (e.g., program command to program or write the L2P table reclaim data) completes.

In some arrangements, the SSD 600 can start to send host write data (e.g., part-filled host write data) to the NAND device 650 before host write data with a whole or full amount of an FSP unit (e.g., 192 KB) is available in the write data buffers 630. In this manner, the host write data can be transferred in multiple chunks before transferring or writing a program command (e.g., array program command), so that NAND read commands can be executed between the data transfers.

In some arrangements, the host write data buffer 630 can be freed up before data stored in the host write data buffer with the whole (or full) data amount of an FSP unit (e.g., 192 KB) is transferred and programming the transferred data has started. When a sudden power loss occurs, the controller 620 (e.g., SoC controller) can trigger the NAND device 650 to program or write part-filled host write data to the NAND memory. The LUT can be updated for only those clusters/data transferred to the NAND device 650. The NAND device 650 can write part-filled host write data stored in the write program data registers 672 using a 3 pSLC mode that can be performed quicker and can save more energy than a TLC mode. In some arrangements, periodically, when no write data has been sent to the NAND device 650 for a significant period of time, the controller 620 can send a command to program or write part-filled host write data to the NAND memory 654.

Figure 7:
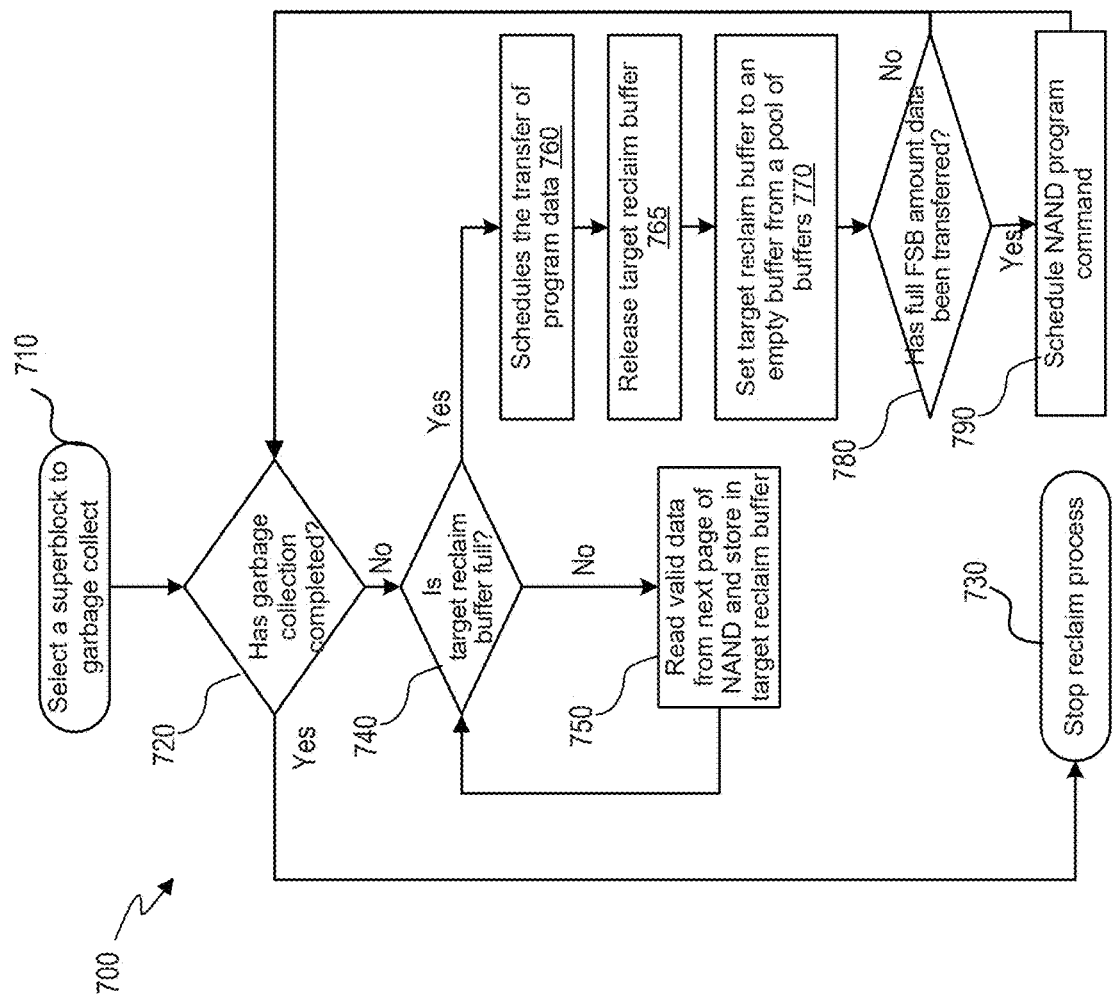
FIG. 7 is a flowchart diagram illustrating an example method for performing garbage collection in a storage device, according to some arrangements.

FIG. 7 is a flowchart diagram illustrating an example method (e.g., a reclaim process) for performing garbage collection in a storage device (e.g., SSD 600), according to some arrangements. In this example, a reclaim process 700 begins in 710 by selecting or identifying a superblock (e.g., superblock candidate 330-0) to garbage collect. The reclaim process can be performed by a storage device (e.g., SSD 600) or a controller thereof (e.g., controller 620 or buffer manager 624).

In 720, in some arrangements, the controller 620 may determine whether garbage collection has completed. In 730, in some arrangements, in response to determining that garbage collection has completed, the controller 620 may stop the reclaim process. In 740, in some arrangements, in response to determining that garbage collection has not completed, the controller 620 (e.g., buffer manager 624) may determine whether a target reclaim buffer (e.g., reclaim data buffers 640) is full for an amount of a first threshold. For example, the first threshold may be a size (e.g., 64 KB) which is less than a second threshold corresponding to a full amount of NAND FSP (e.g., 192 KB).

In 750, in some arrangements, in response to determining that the target reclaim buffer 640 is not full for the amount of the first threshold (e.g., less than 64 KB), the controller 620 may read valid data from the superblock (e.g., superblock candidate 330-0). For example, the controller 620 may read valid data from the next page of a NAND memory (e.g., from the next page of die 1 of the superblock candidate 330-0) and temporarily store the valid data in the target reclaim buffer 640. The size of the reclaim data buffer 640 may be greater than or equal to the amount of the first threshold.

In 760, in some arrangements, in response to determining that the target reclaim buffer is full for the amount of the first threshold (e.g., the size of the reclaim data buffer 640 is greater than or equal to 64 K), the controller (e.g., FTL 130 or buffer manager 624) may schedule the transfer of program data (e.g., reclaim data stored in the reclaim data buffer 640 having the size of 64 KB) to a NAND device (e.g., NAND chip 650-1). The controller (e.g., buffer manager 624) may transfer or write the reclaim data to a reclaim program data register of the NAND device (e.g., reclaim program data register 671-1 of NAND chip 650-1).

In 765, in some arrangements, the controller may release, delete, or empty the reclaim data immediately after the program transfer has finished. In other words, the release does not need to wait until the following program operation (which may be much longer than the transfer operation) has finished. In some arrangements, in response to completion of the transfer of program data to the NAND device, the reclaim data buffer 640 occupied by the transferred data may be released or emptied. This can make more reclaim data buffer space available and make it more likely that reclaim data will reside in memory internal to the controller (e.g., SoC) and thus can improve performance.

In 770, in some arrangements, the buffer manager 624 may set the reclaim data buffer 640 to an empty buffer. The buffer manager 624 may set the size of valid data stored in the reclaim data buffer 640 to zero. In some arrangements in which the reclaim data buffer 640 is formed using a linked list (e.g., linked list 460) of pointers to buffers selected from a pool of buffers (e.g., pool of buffers 450), the buffer manager 624 may delete, from the linked list, the pointers to the buffers corresponding to the reclaim data buffer 640.

In 780, in some arrangements, the controller (e.g., buffer manager 624) may determine whether data with a full amount of NAND FSP (e.g., 192 KB) has been transferred or written to the NAND device (e.g., NAND chip 650-1). The controller may determine whether a size of data stored in the reclaim program data register 671-1 of the NAND chip 650-1 is greater than or equal to the full amount of NAND FSP (e.g., 192 KB). In response to determining that the full amount of NAND FSP has not been transferred or written to the NAND device, the controller may perform step 720 to resume read of valid data from the superblock (e.g., superblock candidate 330-0). In this manner, the read of valid data from the superblock can continue to be performed until the amount of reclaim data transferred or written to the NAND reaches the full amount of NAND FSP (e.g., 192 KB). In 790, in some arrangements, in response to determining that the full amount of NAND FSP has been transferred or written to the NAND, the controller (e.g., FTL 130 or buffer manager 624) may schedule a NAND program command to program or write the reclaim data with the full amount of NAND FSP (e.g., the reclaim data stored in the reclaim program data register 671-1 of the NAND chip 650-1) to the NAND memory (e.g., memory cell array 654-1).

Figure 8:
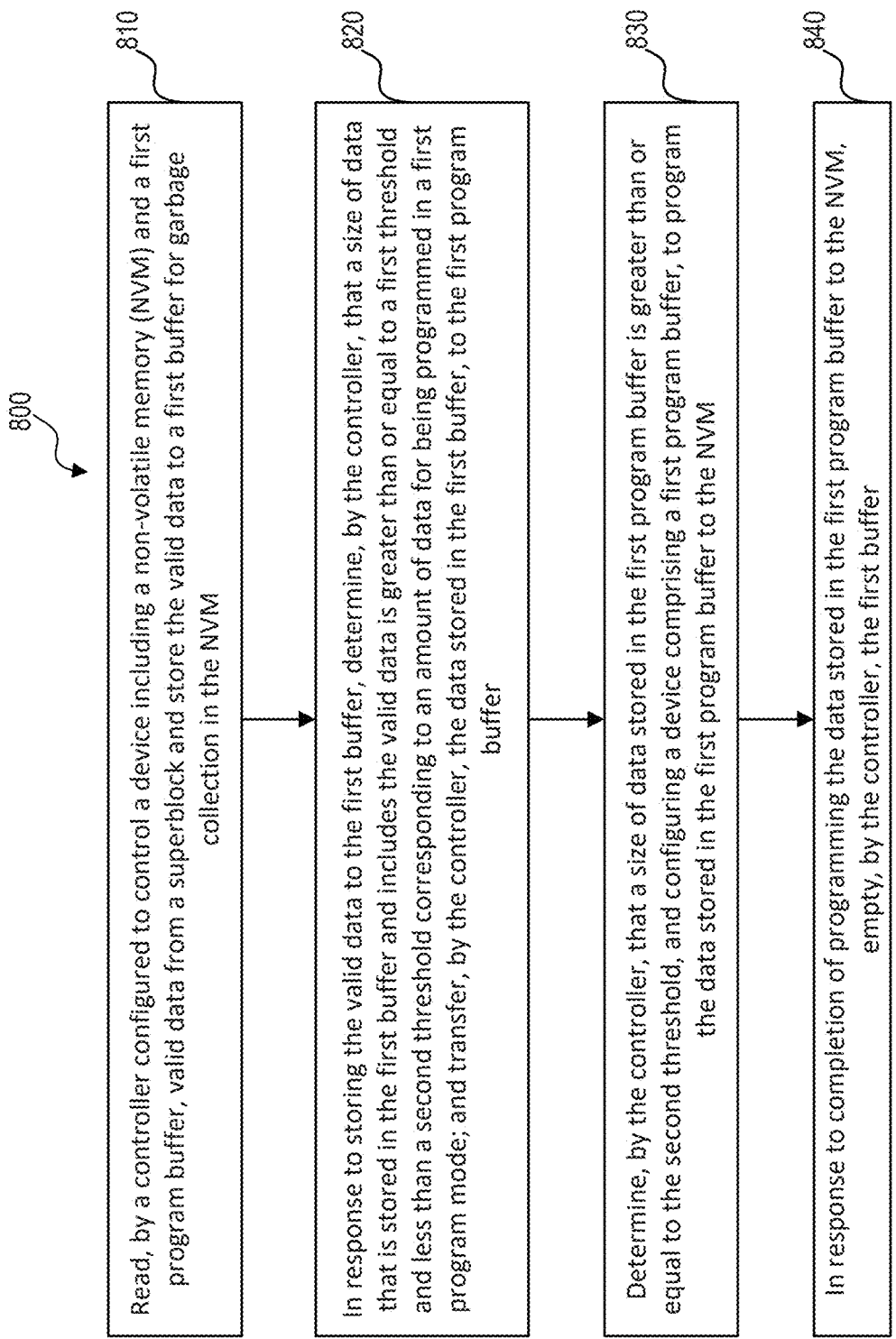
FIG. 8 is a flowchart illustrating an example method for managing memory buffers for garbage collection in a storage device, according to some arrangements.

FIG. 8 is a flowchart illustrating an example method for managing memory buffers for garbage collection in a storage device (e.g., SSD 600), according to some arrangements. In this example, a process 800 begins in 810 by reading, by a controller (e.g., controller 620, superblock manager 622, buffer manager 624) configured to control an NVM array (e.g., NAND device 650) including an NVM (e.g., NAND memory 654) and a first program buffer (e.g., reclaim program data registers 671), valid data from a superblock (e.g., superblock 330-0) and store the valid data to a first data buffer (e.g., reclaim data buffers 640) for garbage collection.

In 820, in some arrangements, in response to storing the valid data to the first data buffer (e.g., reclaim data buffers 640), the controller (e.g., buffer manager 624) may determine that a size of data that is stored in the first data buffer and includes the valid data is greater than or equal to a first threshold (e.g., 4 KB) and less than a second threshold corresponding to an amount of data for being programmed or written in a first program mode (e.g., a full data amount of a full sequence program (FSP) unit such as 192 KB). In some arrangements, the first program mode may be a full sequence program. In some arrangements, a size of the first data buffer may be equal to the first threshold (e.g., 4 KB). In response to determining that the size of the data that is stored in the first data buffer and includes the valid data is greater than or equal to the first threshold and less than the second threshold (e.g., determining that the size of the data is equal to the size of the first data buffer (4 KB)), the controller may transfer or write the data stored in the first data buffer, to the first program buffer (e.g., reclaim program data registers 671). The data stored in the first program buffer may be programmed or written to the NVM using the full sequence program. A size of the first program buffer may be equal to the second threshold (e.g., 192 KB).

In 830, in some arrangements, the controller (e.g., buffer manager 624) may determine that a size of data stored in the first program buffer (e.g., reclaim program data registers 671) is greater than or equal to the second threshold (e.g., 192 KB), and program or write the data stored in the first program buffer to the NVM (e.g., NAND memory 654).

In 840, in some arrangements, in response to completion of transferring or writing the data stored in the first data buffer to the first program buffer, the controller may empty or release the first data buffer (e.g., reclaim data buffers 640). In some arrangements, in emptying the first data buffer, a size of valid data stored in the first data buffer may be set to zero. In some arrangements in which the first data buffer is formed using a linked list (e.g., linked list 460) of pointers to buffers selected from a pool of buffers (e.g., pool of buffers 450), the controller may delete, from the linked list, the pointers to the buffers corresponding to the first data buffer.

In some arrangements, the NVM array may further include a second program buffer (e.g., write program data register 672) that is different from the first program buffer (e.g., reclaim program data register 671). The write data received from a host (e.g., host write date stored in the write data buffer 630) may be transferred or written by the controller (e.g., controller 620) to the second program buffer (e.g., write program data register 672). The NVM array (e.g., NAND device 650) may be configured by the controller to program or write data in the second program buffer (e.g., write program data register 672) to the NVM (e.g., memory cell array 654) with a priority higher than a priority with which data stored in the first program buffer (e.g., reclaim program data register 671) is programmed or written to the NVM. The controller may be configured to program or write the write data in the second program buffer to the NVM using a pseudo single-level cell (pSLC) mode. For example, upon a power loss, the NAND device 650 can write part-filled host write data stored in the write program data register 672 using a 3 pSLC mode which can be performed quicker and can save more energy than a TLC mode.

In some arrangements, the NVM array (e.g., NAND device 650) may further include a third program buffer (e.g., L2P table reclaim program data register) that is different from the first program buffer (e.g., reclaim program data register 671). Further data representing mapping of logical addresses to NVM physical addresses (e.g., L2P table reclaim data) may be read from a further superblock. The further data (e.g., L2P table reclaim data) may be transferred or written to the third program buffer (e.g., L2P table reclaim program data register). The NVM array may be configured by the controller to program or write data in the third program buffer (e.g., L2P table reclaim program data register) to the NVM (e.g., memory cell array 654) with a priority higher than a priority with which data stored in the first program buffer (e.g., reclaim program data register 671) is programmed or written to the NVM.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. The functions implemented in software may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A system comprising:
   a controller;
   a non-volatile memory (NVM) array comprising an NVM and a first program buffer; and
   a first data buffer for storing data for garbage collection,
   wherein the controller is configured to:
      read valid data from a superblock and store the valid data to the first data buffer;
      in response to storing the valid data to the first data buffer,
         determine a size of data that is stored in the first data buffer and comprises the valid data,
         determine that the size of the data is greater than or equal to a first threshold and less than a second threshold that corresponds to an amount of data for being programmed in a first program mode, and
         write the data stored in the first data buffer, to the first program buffer;
      determine that a size of data stored in the first program buffer is greater than or equal to the second threshold, and write the data stored in the first program buffer to the NVM; and
      in response to completion of writing the data stored in the first data buffer to the first program buffer, empty the first data buffer.

2. The system of claim 1, wherein the first program mode is a full sequence program.

3. The system of claim 2, wherein the NVM array is configured to write the data stored in the first program buffer to the NVM using the full sequence program.

4. The system of claim 1, wherein
   the NVM array further comprises a second program buffer that is different from the first program buffer, and
   the controller is configured to write data received from a host, to the second program buffer.

5. The system of claim 4, wherein the controller is configured to write data in the second program buffer to the NVM with a priority higher than a priority with which data stored in the first program buffer is written to the NVM.

6. The system of claim 4, wherein upon a power failure, the controller is configured to write the data in the second program buffer to the NVM using a pseudo single-level cell (pSLC) mode.

7. The system of claim 1, wherein
the device further comprises a third program buffer that is different from the first program buffer, and
the controller is configured to
    read, from a second superblock, further data representing mapping of logical addresses to NVM physical addresses; and
    write the further data to the third program buffer.

8. The system of claim 7, wherein the controller is configured to write data in the third program buffer to the NVM with a priority higher than a priority with which data stored in the first program buffer is written to the NVM.

9. The system of claim 1, wherein
a size of the first data buffer is equal to the first threshold, and
a size of the first program buffer is equal to the second threshold.

10. The system of claim 1, wherein
the controller is configured to empty the first data buffer by setting a size of valid data stored in the first data buffer to zero.

11. A method comprising:
reading, by a controller configured to control a non-volatile memory (NVM) array comprising a non-volatile memory (NVM) and a first program buffer, valid data from a superblock and store the valid data to a first data buffer for garbage collection;
in response to storing the valid data to the first data buffer, determining, by the controller, that a size of data that is stored in the first data buffer and comprises the valid data is greater than or equal to a first threshold and less than a second threshold corresponding to an amount of data for being written in a first program mode, and
    writing, by the controller, the data stored in the first data buffer, to the first program buffer;
determining, by the controller, that a size of data stored in the first program buffer is greater than or equal to the second threshold, and writing, by the controller, the data stored in the first program buffer to the NVM; and
in response to completion of writing the data stored in the first data buffer to the first program buffer, emptying, by the controller, the first data buffer.

12. The method of claim 11, wherein the first program mode is a full sequence program.

13. The method of claim 12, wherein the data stored in the first program buffer is programmed to the NVM using the full sequence program.

14. The method of claim 11, wherein
the NVM array further comprises a second program buffer that is different from the first program buffer, and
the method further comprises writing, by the controller, data received from a host, to the second program buffer.

15. The method of claim 14, further comprising:
writing, by the controller, data in the second program buffer to the NVM with a priority higher than a priority with which data stored in the first program buffer is written to the NVM.

16. The method of claim 14, further comprising:
upon a power failure, writing, by the controller, write the write data in the second program buffer to the NVM using a pseudo single-level cell (pSLC) mode.

17. The method of claim 11, wherein
the NVM array further comprises a third program buffer that is different from the first program buffer, and
the method further comprises
    reading, from a further superblock, further data representing mapping of logical addresses to NVM physical addresses; and
    writing the further data to the third program buffer.

18. The method of claim 17, further comprising:
writing, by the controller, data in the third program buffer to the NVM with a priority higher than a priority with which data stored in the first program buffer is written to the NVM.

19. The method of claim 11, wherein
a size of the first data buffer is equal to the first threshold, and
a size of the first program buffer is equal to the second threshold.

20. The method of claim 11, wherein
emptying the first data buffer comprises setting a size of valid data stored in the first data buffer to zero.

* * * * *